June 13, 1944. C. W. BRISTOL 2,351,394
MULTIPLE-POINT CONNECTING DEVICE
Filed Feb. 11, 1942

INVENTOR.
CARLTON W. BRISTOL
BY
E. C. Sanborn
Attorney

Patented June 13, 1944

2,351,394

UNITED STATES PATENT OFFICE 2,351,394

MULTIPLE-POINT CONNECTING DEVICE

Carlton W. Bristol, Naugatuck, Conn., assignor to The Bristol Company, Waterbury, Conn., a corporation of Connecticut Application February 11, 1942, Serial No. 430,429

14 Claims. (Cl. 74—52)

This invention relates to multiple-point contacting or connecting devices, and more especially to means for operating successively or selectively pilot valves or switches of the type in which actuation is effected through a small linear motion of a stem or operating pin. In industrial practice there are found a number of forms of pilot valves suited to the control of small volumes of pressure fluid, and of switches for controlling electric circuits, in whose design the actuating element takes the form of a small pin or stem. The operation of a device of this nature is effected by the pin or stem being depressed against the influence of a spring through a distance which is seldom more than a very small fraction of an inch. The design of these valves and switches usually requires that the stem or pin be of relatively small diameter, rendering it desirable that the actuating force be applied in a sense substantially longitudinal to said pin or stem with a minimum of lateral component.

A field wherein the application of devices of this nature is particularly important is found in the structure of the multiple-point switch, such as is used in the selective connection of a pyrometer to individual thermocouples of a group. Another important field of application is found where it is required to operate selectively a number of pilot valves for the connection of different elements of a pneumatic telemetering system to a single receiver.

It is an object of the present invention to provide a device whereby the operation of a valve or switch of the class referred to may be effected in a positive manner and with a negligible side-strain on the operating member.

It is a further object to provide means wherein the desired result may be obtained with a minimum of friction.

It is a further object to provide means as hereinbefore set forth which shall be inexpensive to manufacture, durable in operation, and not subject to deterioration of structure or adjustment under long-continued service. In carrying out the purposes of the invention it is proposed to employ that type of motion which is represented by the "roulette" (defined in the Funk & Wagnalls New Standard Dictionary as the locus of a point rigidly connected with a curve that rolls upon another fixed curve or straight line). To that end, I utilized the principle of a planetary gear train, in which actuation of the valve or switch element is effected by engagement with a member integral with the planetary element of such a train. By proper proportioning of the elements of such a train, it is possible to cause a point on the planetary member to describe a roulette having cusps at predetermined points in the travel of the planetary member; and these cusps may be made to be substantially perpendicular to the direction of travel of the planetary member, thus providing between the moving element of the train and the operating member of the valve or switch an operative engagement in which the point of contact will move in a path substantially linear to said operating member during the time of engagement.

Figure 1:
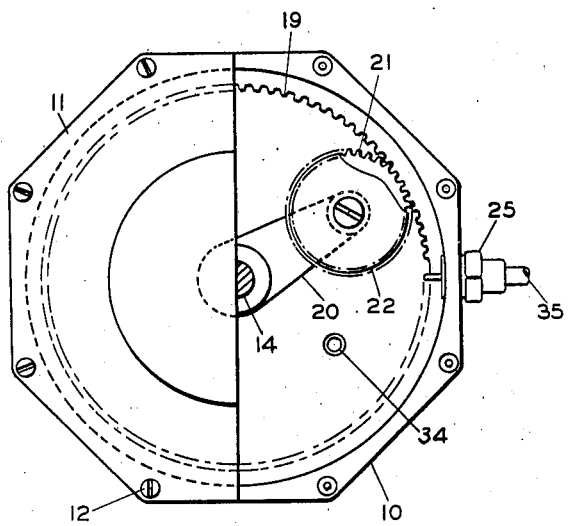
Fig. 1 is a top elevation, partly in section, of a device incorporating the principles of the invention, and especially adapted to the actuation of a plurality of air valves.

Referring now to the drawing:

The numeral 10 designates a cup-shaped mounting adapted to function both as a support for the elements of the mechanism and a container for the same. A cover plate 11 is adapted to be secured to the element 10 as by screws 12 and sealed thereto as required by means of a gasket 13. A spindle 14 rests in a bearing 15 centrally located in the bottom portion of the cup 10, and projects through the center of the cover plate 11, where it may be caused to form a gas-tight joint by means of a stuffing box 16 and packing 17. A knob 18 fixed to the spindle 14 provides for manual rotation of said spindle.

Fixed to the interior of the mounting 10 and concentrically with the spindle 14 is an internal gear 19. Carried by the spindle 14 is an arm 20 having mounted thereon, and rotatable about an axis parallel to, but displaced from, that of the spindle 14 a shaft 20' to which is attached a planetary gear 21 meshing with the internal gear 19, and adapted to be rotated about the axis of shaft 20' by engagement of the gears 21 and 19 as it is carried around within the internal gear 19 by rotation of the arm 20 when the spindle 14 is turned by means of the knob 18. Fixed to the shaft 20' and adapted to rotate integral with the gear 21 is a cylindrical element 22 having a diameter equal to the pitch diameter of the gear 21. In the mechanism as thus far set forth, it will be seen that as the shaft 14 is rotated by means of the knob 18 carrying the planetary member through a circular path within the mounting 10 any selected point on the rim of the element 22 will describe a hypocycloidal path based on the pitch circle of the internal gear 19.

Figure 3:
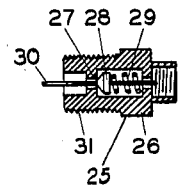
Fig. 3 is a sectional view of a valve to whose operation the invention is especially adapted.

In Fig. 3 is shown a valve 25 of a type especially adaptable to use with the operating mechanism herein described. This valve is of the type commonly known as a "tire valve" and involves the general principle and structure set forth in U. S. Letters Patent No. 591,012 issued October 5, 1897, to George H. F. Schrader. The valve 25 comprises a body part 26 having therein an annular seat portion 27 adapted to be engaged by a seating member 28 under the influence of a spring 29. A pin 30 projects longitudinally from the valve body and is adapted to lift the seating member 28 out of engagement with the seat 27 in opposition to the force of the spring 29 when depressed in the direction of its axial length. The body 26 is provided with an externally threaded portion 31 adapted for engagement with any one of a group of tapped openings 32 located about the periphery of the mounting 10. The radial positioning of each of said valves when screwed into the openings 32 is such that the tip of each valve stem will normally lie slightly within the pitch circle of the gear 19. It will be seen that when the cover plate 11 is secured to the mounting 10 and sealed by the gasket 13, the packing 17 in the stuffing box 16 also being tightened about the spindle 14, there will be formed within the mounting 10 a closed chamber adapted to be placed in communication selectively with any one of the valves 25 whose stem may be depressed. Communication between the interior of the chamber and a single instrument or the like external thereto may be directly established by means of a tapped opening 33 adapted for connection of a pipe or conduit 34; and connection with fluid-pressure devices to be selectively placed in communication with said pipe or conduit may be established by further condits 35 suitably attached to the valves 25.

Figure 2:
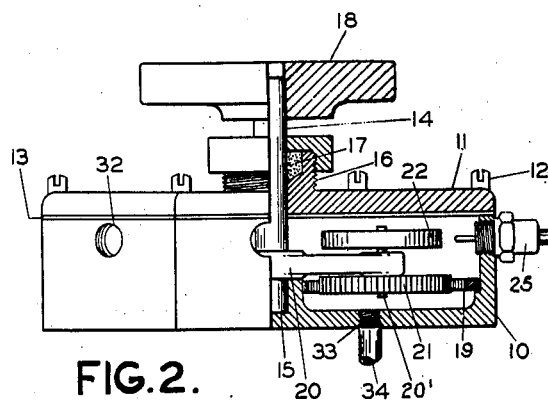
Fig. 2 is a side elevation of the same, partly in section.
Figure 6:
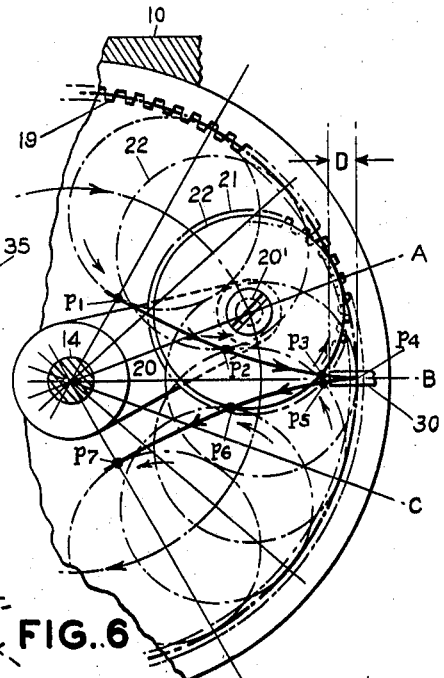
Fig. 6 is a diagram providing a geometrical analysis of the motions of essential parts of the device.

The relative action of the elements of the mechanism as thus far disclosed may best be understood by reference to Fig. 6, wherein are shown to an enlarged scale a portion of the internal gear 19 and the planetary gear 21 in several different positions with respect to the stem 30 of a valve 25. The operation of the mechanism may be considered as taking place with the arm 20 which carries the planetary gear 21 being rotated in a clockwise sense about the axis of the spindle 14. With the parts in the position shown at A, a point on the pitch circle of the gear 21 (which may be considered as coinciding with the periphery of the element 22 in Fig. 2) has just about engaged the tip of the valve stem 26 at $p_3$. The path of such point may now be taken under consideration. This point will have been following a hypocycloidal path $p_1$, $p_2$, $p_3$, and as it engages the valve stem 30 at substantially $p_3$ will be approaching a cusp of that path. As the arm 20, carrying the gear 21, continues to move toward position B, where the point $p_4$ lies upon the pitch circle of the internal gear 19 and represents a cusp of the hypocycloidal path, the curvature of the hypocycloid will approach a perpendicular to a tangent of said pitch circle, and the excursion of the point of engagement between the periphery of the cylindrical element 22 and the stem 30 will be substantially radial to said circle, and longitudinal to said stem, through a distance D, representing the normal operating travel of the pin. As the arm 20 reaches the position B, the point $p_4$ will attain its maximum excursion in a sense radial to said circle, and will momentarily lie upon the same in a position corresponding to maximum deflection of the valve-stem 30 to which position it will have caused said valve-stem to be moved. As the arm 20 continues to move toward and through the position C, the point above referred to will follow the path $p_4$, $p_5$, $p_6$; and, until its disengagement from the stem 30 during movement of the arm 20 away from position B to position C, said point will travel in a path departing little from said perpendicular. Thus, during the time of engagement between the surface of the roller 22 (whose radius corresponds to that of the pitch circle of idler 21) and the valve stem 30, the point on said surface at which engagement first took place will have traveled through a very small distance in the direction of the circumference of the gear 19. In other words, the motion of the surface of the element 22 in a sense perpendicular to the line of action of the engaging valve-stem 30 will have been materially less than the angular motion of the arm 20. In actual operation, from the time the stem 30 is engaged by a point on the periphery of the roller 22 until it is released by said roller, there will be a slight sliding motion between the roller and the tip of the stem in a direction perpendicular to the motion of said stem; but as will be apparent from an inspection of Fig. 6, this motion will be very much less than if the stem had been engaged by a cam surface or the equivalent directly carried by the arm 20. Since the point on the rim of the element 22 which engages the valve stem is not definite, but is determined by the relative position of operating parts at the moment of engagement, there is no limit to the closeness of spacing which may exist between successive valves other than that imposed by the physical diameters of the valve bodies; and this limit may be materially reduced by offsetting the location of said valves in a direction perpendicular to the plane of rotation of the arm 20. The device as practically constructed is provided with a detent or "click" to ensure the moving part coming to rest in the full open position of the engaged valve, and also with a pointer and scale to indicate which of the valves is open at any particular setting. As these elements are well known in the art and form no part of the present invention, they are for purposes of clarity and simplicity omitted from the drawing.

In the foregoing analysis, the cylindrical element 22 has been assumed as having a diameter equal to that of the pitch circle of the idler 21. This represents a special form of structure; but it may be found expedient in practice to construct said element with a diameter slightly greater than, or slightly less than, that of the pitch circle of idler 21, in which case the path of any selected point upon the periphery of said roller will be a curtate, or a prolate, hypotrochoid, according to whether the radius of the element 22 is greater than, or less than, that of the associated pitch circle of the gear 21. In either case the conditions corresponding to those set forth in the above geometric analysis are approximated without departing from the spirit of the invention. The term "hypocycloidal" as used in the appended claims includes the aforementioned hypotrochoidal motions.

Figure 5:
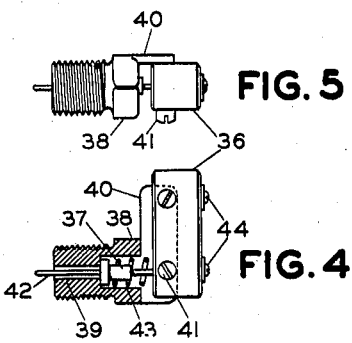
Fig. 5 is an end elevation of the same.
Figure 4:
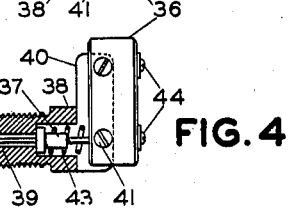
Fig. 4 is a side elevation of a mounting through which a conventional form of switch may be operated by the device.

The valves 25 which have been considered as forming a part of the structure as thus far disclosed and analyzed, may be replaced by switches 36 which may expediently be of the type indicated in Figs. 4 and 5, and fully set forth and described in U. S. Letters Patent No. 1,960,020 issued May 22, 1934 to P. K. McGall. The operation of a switch of this form is effected by the axial movement of a projecting stem or button 37 through a very small linear distance. In Figs. 4 and 5 a switch of this class is shown as supported by a mounting 38, whereby the assembly may readily be substituted for one of the valves 25 hereinbefore described. The mounting 38 comprises a hollow body part 39 threaded for engagement with any one of the openings 32, and bearing a bracket part 40 to which the switch 36 may readily be attached by means of screws 41. Within the hollow of the body part 38 is positioned an operating pin or tappet 42, normally held to its inmost position by means of a spring 43, and adapted to be forced against the influence of said spring to actuate the stem 37, and hence the switch 36, upon engagement of the inner extremity of the tappet 42 by the element 22. Terminal screws 44 provide connection between the switch 36 and any outside circuit in which it may be desired to be included. Any desired number of switches of the type set forth, and carried by mountings similar to that described, may be attached to the mounting 10 to be operated by the cycloidal mechanism in a manner identical to that hereinbefore set forth. If desired, both switches and valves may be assembled on the structure and in any desired order which their physical dimensions will permit. Switches of the general type described are commercially available with various contact arrangements, thereby rendering the combination adaptable to a great variety of electrical circuit connections. Where electrical switches are utilized without the use of air valves, there is no need that the seal or container 10, with its cover plate 12 should be of gas-tight construction, in which case the mechanical features of the structure may be simplified.

Figure 7:
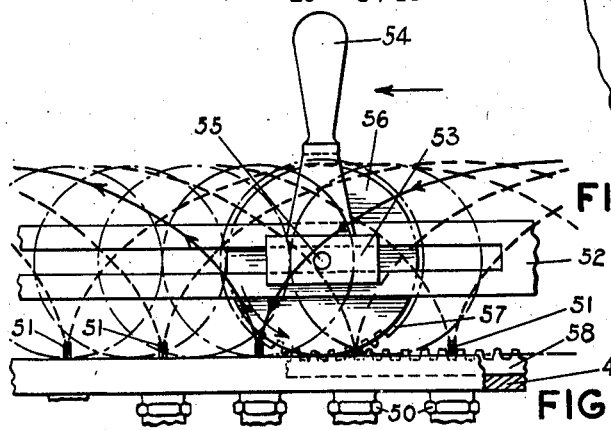
Fig. 7 is a diagrammatic view illustrating an alternative embodiment.

In Fig. 7 is shown an alternative form of the invention, in which the valves or switches or other elements to be actuated are disposed along a plane, rather than a curved surface, and the actuating member is constrained to travel in a straight path parallel to said plane, and at the same time to rotate about an axis travelling in said path, whereby points on the engaging surface of the actuating member follow cycloidal paths, and therefore, during their engagement with the actuated elements possess a preponderating component of motion in a sense parallel to that of the moving parts of the actuated elements. Spaced along a straight bar 49 are control devices 50, which may be valves, as shown in Fig. 3, switches, as shown in Figs. 4 and 5, or other devices to be actuated. For the purpose of actuation, the control devices are provided with stems 51 movable through a limited range in a sense perpendicular to the direction of the bar 49. Translatable along a guide bar 52 disposed parallel to the bar 50 is a block 53, which may be manually moved to any desired position by means of a handle 54. Rotatably mounted about a spindle 55 perpendicular to the plane of the bar 49 and the guide bar 52 is a cylindrical member or roller 56 having a smooth surface adapted to engage the stems 51. Fixed to the roller 56, and rotatable therewith about the spindle 55 is a gear member or pinion 57 having its pitch circle of substantially the same diameter as that of said roller. Fixed to the bar 49 is a rack 58 meshing with the pinion 57, whereby, when the latter is subjected to translatory motion as the block 53 is moved along the guide bar 52, the pinion will be caused to rotate, constraining the roller 56 to rotate in a similar sense and all points on the periphery of the same to follow cycloidal paths. Thus, it will be seen that as each of the stems 51 is operably engaged by the surface of the roller 56, the point of said surface which is in contact with the tip of the stem will be subjected to only a very slight motion in a sense perpendicular to the direction of movement of the stem, and that by suitable proportioning of associated parts, said motion may be reduced to desired negligible magnitude. If the cylindrical element 22 be constructed with a diameter slightly different from that of the pitch circle of the idler gear 21, in the arrangement shown in Fig. 7, the path of any selected point on the periphery of said element will be a trochoid, approximating the conditions hereinbefore described, and within the spirit of the invention. The term "cycloidal" when used in the appended claims, includes such trochoidal motions.

Since the engaging rollers shown in both forms of the invention have smooth cylindrical surfaces, it follows that any point on such surfaces during its approach to the pitch line of the gear 19 or rack 58, possesses a minimum of lateral motion, with the result that a control element, wherever positioned along its surface of location, will be actuated in the desired manner. Therefore, while the valves and switches have been shown as uniformly spaced with respect to the path of the actuating element, they need not be so distributed, but may be arranged in any sequence of timing that may be found desirable for purposes of the installation. It will be further apparent that while both forms of the invention have been shown as adapted to manual operation, the principle is in no sense so restricted and that the device may be incorporated in a mechanism whereby the movement of the engaging and actuating roller is derived from motion of elements of the mechanism.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In combination with a member adapted to travel in a predetermined path for actuating an element for limited translation in a sense transverse to said path, a stationary gear member disposed with its pitch line substantially parallel to said first-named path, a pinion mounted on an axis carried by said traveling member and meshing with said gear member, a rotatable part integral with said pinion and having a cylindrical surface coaxial with the same and adapted to engage said element at indefinite points of said surface and for a limited portion of the travel of said traveling member.

2. Means for selectively actuating a plurality of control members disposed about a circular locus and each adapted for actuation by limited translation of an element in a sense radial to said locus, said means comprising a gear member having its pitch circle substantially coincident with said locus, an arm rotatable about an axis through the center of said circle, a pinion rotatably carried by said arm and meshing with said gear member, a rotatable part integral with said pinion and having a cylindrical surface coaxial with the same and adapted successively to engage said elements at indefinite points of said surface, and for a limited portion of the rotation of said arm.

3. Means for selectively actuating a plurality of control members disposed about a circular locus and each adapted for actuation by limited translation of an element in a sense radial to said locus, said means comprising an internal gear member having its pitch circle substantially coincident with said locus, an arm rotatable about an axis through the center of said circle, a pinion rotatably carried by said arm within said gear member and meshing with the same, a rotatable part integral with said pinion and having a cylindrical surface coaxial with the same and adapted successively to engage said elements at indefinite points of said surface, and for a limited portion of the rotation of said arm.

4. Apparatus for selectively actuating a plurality of control members disposed about a curved locus, each of said members being adapted for actuation by limited translation of an element in a sense transverse to said locus, said apparatus comprising a stationary gear member having its pitch line substantially coincident with said locus, a movable arm, a pinion carried by said arm and meshing with said gear member, a part rotatable with said pinion and having a curved surface coaxial with the same and adapted successively to engage said elements at indefinite points of said surface and for a limited portion of the movement of said arm.

5. In combination, a plurality of control members disposed about a curved locus, each of said members being adapted for actuation by translation of a part thereof in a sense transverse to said locus, a rotatable element having a surface adapted for successive engagement of said parts of said members at indefinite points of said surface, and means for causing said points to follow hypocycloidal paths and to actuate said parts transversely of said locus at cusp portions of said hypocycloidal paths.

6. In combination, a control member adapted to be actuated by translation of a part thereof, an actuating member movable in a given path transverse to the direction of translation of said part, a rotatable element movable with said actuating member and having a surface adapted to engage said control member part at a point on said surface, and means cooperating with said actuating member for imparting hypocycloidal motion to said point, said control member part being so related to the path of travel of said rotatable element as to be engaged by said point in a cusp portion of said hypocycloidal motion.

7. In combination, a plurality of control members disposed about a given locus and each having an actuating element arranged for translatory movement in a sense transverse to said locus, a member adapted to travel in a given relation to said locus, a part carried by said traveling member and having a surface adapted to engage said elements, and means for causing points on said surface engageable with said elements to follow roulette paths and to actuate said control members by moving said elements at portions of said paths wherein said points have minimum components of motion in directions longitudinal of said locus.

8. In combination, a plurality of control members disposed about a curved locus and each having an actuating element arranged for translatory movement in a sense substantially radial to said locus, a member adapted to travel in a curved path corresponding with said locus, a part carried by said traveling member and having a surface adapted to engage said elements, and means for causing points of said surface engageable with said elements to follow roulette paths and to actuate said control members by moving said elements at portions of said paths wherein said points have minimum components of motion tangential to said locus.

9. In combination, a member adapted to travel in a substantially straight path for actuating an element for limited translation in a sense transverse to said path, a stationary part extending in a substantially straight path, a part carried by said traveling member and having a surface of which indefinite points are adapted to engage said element, said carried part being so related to said stationary part as to give to said points roulette motion whereby when in engagement with said element said points will be moving in a direction substantially in the line of translation of the same.

10. In combination, a plurality of control members disposed along a substantially straight path and each having an actuating element arranged for translatory movement in a sense transverse to said path, a member adapted to travel in a path corresponding with said substantially straight path, a part carried by said traveling member and having a surface adapted to engage said elements, and means for causing points on said surface to follow cycloidal paths.

11. In combination, a plurality of control members disposed along a given locus and each being adapted for actuation by translation of a part thereof in a sense transverse to said locus, a rotatable element having a surface adapted for successive engagement of said parts, means for causing points on said surface engageable with said parts to follow roulette paths and to move said parts at portions of said paths wherein said points have minimum components of motion in a direction longitudinal of said locus, said means comprising a stationary gear member having its pitch line substantially coincident with said locus, a pinion meshing with said stationary gear member, and a connection between said pinion and said rotatable element, each of said parts of said control members projecting in a space at one side of said pitch line for operation toward said pitch line by the surface of said rotatable element.

12. In combination, a plurality of control members disposed about a curved locus and each being adapted for actuation by translation of a part thereof in a sense transverse to said locus, a rotatable element having a surface adapted for successive engagement of said parts, means for causing points on said surface engageable with said parts to follow roulette paths and to move said parts at portions of said paths wherein said points have minimum components of motion tangential to said locus, said means comprising a stationary internal gear member having its pitch line substantially coincident with said locus, a pinion meshing with said internal gear member, and a connection between said pinion and said rotatable element, each of said parts of said control members projecting within the area bounded by said pitch line for operation toward said pitch line by the surface of said rotatable element.

13. In combination, a plurality of control members disposed along a given locus and each being adapted for actuation by translation of a part thereof in a sense transverse to said locus, a rotatable element having a surface adapted for successive engagement of said parts, means for causing the points of said surface to follow hypocycloidal paths having cusp portions of negligible and substantially unvarying extent longitudinally of said locus and for moving said parts at said cusp portions transversely of said locus irrespective of the positions of said parts longitudinally of said locus, said means comprising a stationary gear member having its pitch line substantially coincident with said locus, a pinion meshing with said gear, and a connection between said pinion and said rotatable element, each of said parts of said control members projecting in a space at one side of said pitch line for operation toward said pitch line by the surface of said rotatable element.

14. In combination, a plurality of control members disposed along a curved locus and each being adapted for actuation by translation of a part thereof in a sense transverse to said locus, a rotatable element having a surface adapted for successive engagement with said parts, means for causing the points of said surface to follow hypocycloidal paths having cusp portions of negligible and substantially unvarying tangential extent with respect to said locus and for moving said parts at said cusp portions transversely of said locus irrespective of the positions of said parts along said locus, said means comprising a stationary internal gear member having its pitch line substantially coincident with said locus, a pinion meshing with said internal gear member, and a connection between said pinion and said rotatable element, each of said parts of said control members projecting within the area bounded by said pitch line for operation toward said pitch line by the surface of said rotatable element.

CARLTON W. BRISTOL.